Jan. 29, 1963 T. M. RIDDICK 3,075,645
WATER TREATMENT IN MUNICIPAL AND INDUSTRIAL WATER SYSTEMS
Filed Jan. 6, 1958 2 Sheets-Sheet 1

INVENTOR
THOMAS M. RIDDICK
BY
Curtis, Morris & Safford
ATTORNEYS

INVENTOR
*THOMAS M. RIDDICK*
BY
*Curtis Morris & Safford*
ATTORNEYS

United States Patent Office 3,075,645
Patented Jan. 29, 1963

3,075,645
WATER TREATMENT IN MUNICIPAL AND INDUSTRIAL WATER SYSTEMS
Thomas M. Riddick, 369 E. 149th St., New York 55, N.Y.
Filed Jan. 6, 1958, Ser. No. 707,282
3 Claims. (Cl. 210—197)

This invention relates to the treatment or purification of water for municipal or industrial water systems and, more particularly, to providing for enhanced coagulation and flocculation in rapid sand type water filtration plants.

In water filtration or purification plants, coagulants such as aluminum sulphate, ferrous or ferric sulphate, ferric chloride, etc., may be added to the raw water to be treated for the purpose for forming, upon reaction with other materials in the water, a gelatinous floc or precipitate such as aluminum hydroxide or ferric hydroxide. Such precipitates have the ability to adsorb undesirable impurities and materials in the water such as colloidal coloring matter, iron compounds, manganese, various forms of turbidity, fine sand, silt, loam, microorganisms, etc.

The precipitate forms initially in tiny particles (microscopic or sub-microscopic sizes) which agglomerate by collision among themselves to a larger size. These collisions are brought about by baffling the mixing basin, or in the more up-to-date plants, by mechanical stirrers or flocculators. The detention in the flocculation basin is conventionally 15 to 30 minutes. The formed floc principally settles out in a sedimentation basin. Some of the impurities or undesirable materials removed from the water may be removed by being physically or mechanically enmeshed in the agglomerated floc. It is well known that flocculation as well as crystal formation is aided by and often dependent upon suitable nuclei for initial formation. Raindrops form around such nuclei as atmospheric dust or minerals from evaporated salt (ocean) spray. In the coagulation of water, nuclei are also required, and these are more often silt particles, colloidal clays (natural or added), algae and the like. In some instances, the raw water being treated is initially too clear for good coagulation in that it has insufficient tiny nuclei upon which floc particles may form and grow. In such cases, the ultimate efficiency of purification by coagulation is decreased.

If it is attempted to correct this situation by means which produce vigorous agitation, such as a pump, difficulty may be experienced in that the agitation and/or "rough handling" may tend to break up or peptize the floc particles to such an extent that they may not settle out at all but may be carried over in too great a quantity onto the filter beds to which such treated waters are subjected after a period of sedimentation.

According to this invention, it has been discovered that the coagulant floc itself is a highly efficient source of nuclei upon which additional precipitate will form, and this invention includes a system whereby a small quantity of water is withdrawn from portions of the system where floc concentration is greatest (the effluent end of the flocculation system) and hydrodynamically recirculated to the inlet of the system where floc is just beginning to build up.

One object of this invention is to provide a system of the character described in which water being treated and having a high concentration of well formed floc is recirculated or fed back to the entrance of the system where floc is just beginning to form.

Another object of this invention is to provide, in a system of the character described, apparatus for withdrawing water having a high concentration of floc and recirculating it to the entrance of the system where there is a substantially lower concentration of floc, without peptizing or breaking down the floc particles so withdrawn.

A further object of this invention is to provide methods of the character described for increasing the efficiency of flocculation in water treating systems for the removal of impurities from the water and including a system with high floc concentrations to portions of the system of lower floc concentrations.

Still another object of this invention is to provide, in a water treating system of the character described, methods and apparatus for hydrodynamically and non-mechanically inducing flow of water having a high floc concentration back through portions of the system where a substantially lower floc concentration exists and without substantial break-up of the floc, A still further object of this invention is to provide apparatus of the character described for hydrodynamically inducing feed-back flow of water from one end of the flocculation basin through a conduit back to the other end of the flocculation basin substantially in the absence of pumps or mechanical agitating devices.

Other objects and advantages of this invention will be apparent in the following description, the accompanying drawings, and the appended claims.

Figure 1:
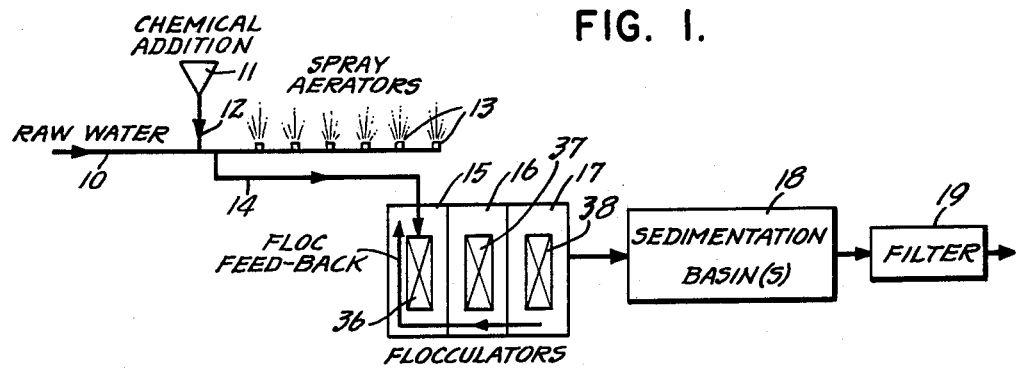
FIG. 1 is a diagrammatic or schematic flow sheet or representation of a portion of a coagulant water filtration plant having the invention applied thereto.

Referring to the drawings, in which like reference characters refer to like parts throughout the several views thereof, a layout for a filtration plant of the character described is indicated generally in the flow sheet schematic showing of FIG. 1. Here the raw water to be treated enters the system through the raw water supply line 10. The various purifying and coagulant chemicals—e.g., aluminum sulphate, ferrous sulphate, ferric sulphate, ferric chloride, etc., from which the floc or gelatinous precipitate is to be formed in the raw water—are added from conventional chemical feeders 11 through feed line 12 to the raw water in line 10. The mixture is then led to a plurality of spray aerators 13 from which the treated water is collected in a trough 14 in known manner and passes to the first of a series of flocculators or flocculation basins, 15, 16, and 17.

In the flocculation basins, the gelatinous precipitate forms and floc particles build up to the desired size adsorbing thereon or enmeshing therein the impurities which it is desired to remove. From the flocculators 15–17, the treated water passes to one or more sedimentation basins 18 where it stands more or less undisturbed during precipitation or settling out of the floc and its adsorbed or enmeshed impurities. After a substantial amount of precipitate has been settled out in sedimentation basin 18, the water is passed over one or more conventional filters 19, and, thence, conventionally into the additional parts of the filtration or distribution system.

The actual volume of chemical added from the feeder 11 is quite small with respect to the volume of water. For example, a system having a raw water input of perhaps 3000 gallons per minute would normally receive an addition of aluminum sulphate from a conventional feeder at the rate of perhaps 10 gallons per minute of dissolved alum. In terms of weight of chemicals, this approximates 200 pounds of dry chemical per million gallons of water. It may be desired to have some mixing agitation upon the addition of the chemical to the raw water, although the inevitable turbulence existing in the flume or pipe line 10 leading to the spray aerators may be relied upon for mixing the coagulant solution with the water to be treated.

After the coagulant is in the water, and whether or not the water is subjected to an aeration such as the spray aerators 13, some provision is made for detention of the water in a mixing or flocculation basin such as 15–17 for a period of time for the gelatinous precipitate to coagulate into desirable large particles preparatory to settling out. Satisfactory results are achieved by providing one or more flocculation basins 15–17 in which the water is retained approximately twenty minutes at the rated capacity of the plant, and such basins are conventionally equipped with one or another type of paddle or other agitator to maintain a mild movement or agitation in the treated water for the purpose of creating as many collisions as possible among floc particles to aid in the agglomeration thereof from the original microscopic or submicroscopic size to particles having a diameter in excess of 0.5 mm. or preferably 1 to 3 mm. The type of agitation may be either a rotating paddle, conventionally made of redwood, and driven to impart to the water a velocity of about 1 foot per second measured at the outermost circumference of the agitator, or a "walking beam" type of reciprocating or oscillating agitator to impart an upward and downward movement to the water instead of a rotary movement. The agitation is, in any case, but moderate to increase collision among the floc particles and produce a floc which is tough and full-bodied, but not so violent that it will tend to prevent its build up to large sized particles. A tough and full-bodied floc is also required to prevent its disintegration or peptization in subsequent passage through pipe lines, etc., and so that it will not tend to break up and pass through or into the filter beds 19.

Figure 3:
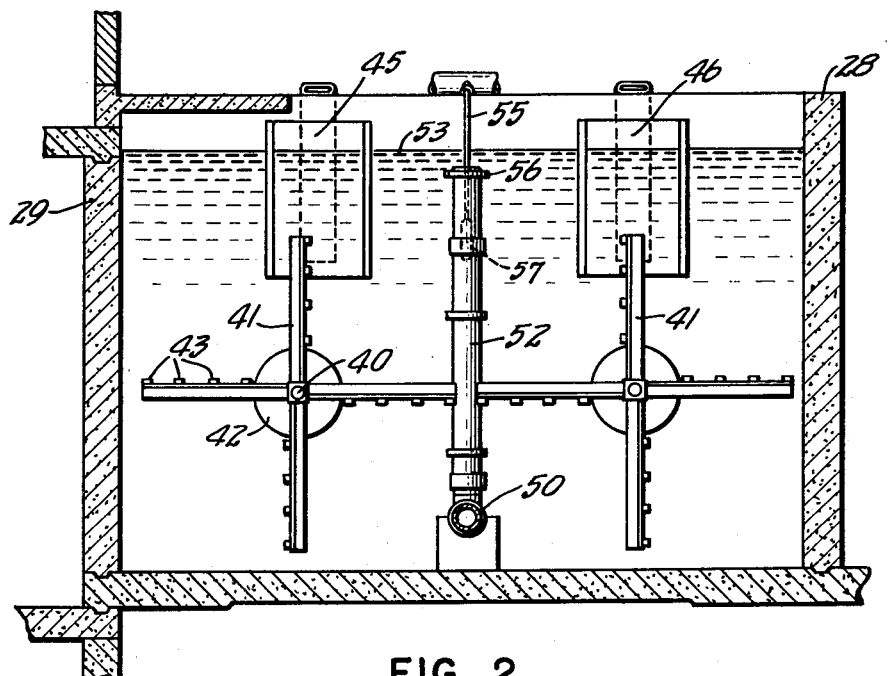
FIG. 3 is a transverse vertical section along the line 3—3 of FIG. 2.
Figure 2:
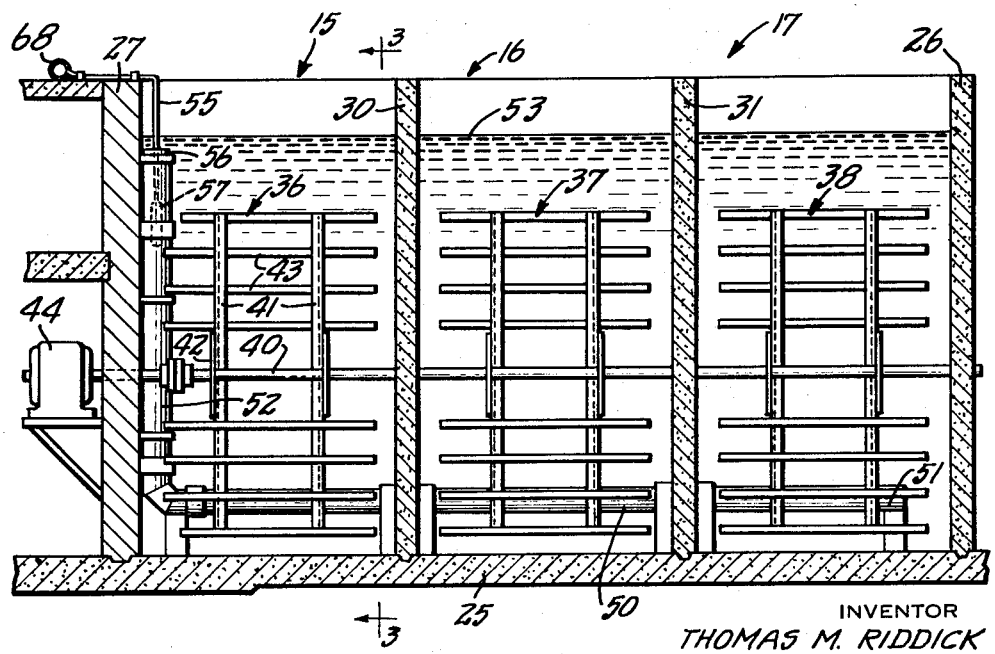
FIG. 2 is a longitudinal vertical section through a series of flocculation basins having the invention applied thereto.

One form of flocculator is shown in FIGS. 2 and 3 as comprising a concrete tank having a base 25, end walls 26 and 27, side walls 28 and 29, and subdivided by internal partitions 30 and 31 to form the three flocculating basins 15, 16 and 17. In each of the three basins 15, 16 and 17, is provided a paddle agitator 36, 37 and 38 comprising a shaft 40 carrying therealong, for each agitator, a plurality of pairs of arms 41 mounted on a spider or disc 42 and carrying therebetween a plurality of paddles 43. Each of the shafts 40 is driven in known manner as by a motor and drive arrangement indicated at 44. The treated water enters the first of the flocculation bays or basins 15 in known manner, as for example, through controllable or closeable flumes 45 and 46 and passes from the basin 15 to the basin 16 and thence to the basin 17 in known manner for a total detention time of approximately 20 minutes with the mild agitation described.

It may be found in some systems—particularly those where the raw water is drawn from large reservoirs where it has stood static for a matter of months—that such thorough precipitation of sediment or turbidity has occurred in the reservoir that the water, although containing many impurities to be removed by adsorption on the coagulant, is so clear and free of suspended materials which might form nuclei for floc formation that the desired intense formation of floc in the flocculators is not obtained. It has been found that a moderate degree of turbidity, perhaps 5 to 25 p.p.m., is generally desirable as a basis of nuclei for floc formation, and, indeed, it is in some cases conventional practice to add to such waters clay or bentonite for creating an artificial turbidity on which the individual floc particles can build as desired.

According to this invention, however, it has been found, that the aluminum hydroxide precipitate or other floc is itself an excellent basis for the desired coagulation if treated and presented in the proper manner. For example, it would be possible with the operation of a mechanical scraper mechanism to break up the floc which precipitates in sedimentation basin 18 and return it to the first flocculator 15 as a source of artificial turbidity. Similarly, one might take a portion of the effluent from the last flocculator 17 and return it by means of centrifugal or reciprocating pump to the inlet end of flocculator 15. Neither of these procedures is preferred, however, because the pumping or scraping has such a tendency to break up or peptize the already formed floc particles, an inherent characteristic of which is that, after having once been broken up or peptized, the ability both to adsorb impurities and to reflocculate is substantially diminished.

A preferred method of recirculating a portion of the concentrated floc from the last flocculator 17 into the raw water entering the first flocculation basin 15 where floc formation is just commencing is also indicated in FIGS. 2 and 3 as providing a hydrodynamic flow inducing recirculation or feed-back with the least disturbance and break up of the suspended floc in the recirculated material.

In particular, a pipe line 50 is provided running through the internal partitions 30 and 31 with an open inlet end 51 in the last flocculator 17 and having a vertical section 52 adjacent the inlet end of the first flocculator 15 and rising to within a short distance below the normal water level 53. Line 50 and its vertical extension 52 may be merely an open pipe, perhaps 8" in diameter, with the intake end 51 thereof approximately 18" from the end of the last flocculator 17. This positioning of the intake end 51 of line 50 is in the vicinity of the densest floc formation in the flocculator 17 and recirculating floc from this dense concentration back to the inlet of the flocculator 15 provides the desired addition of flocculating nuclei in the point in flocculator 15 where flocculation is just commencing.

In order to induce, hydrodynamically instead of mechanically, backward recirculation through line 50 and its upward extension 52, a small, perhaps ¾" diameter, air pipe 55 is provided to extend downwardly through the open upper end 56 of the vertical extension 52 of line 50. The terminal portion of pipe 55 within the vertical pipe 52 is an aerator perforated with $\frac{1}{16}$" or $\frac{1}{32}$" diameter perforations spaced about the surface thereof so as to provide approximately one hole for each square centimeter of the surface area of the air pipe 55 submerged in vertical pipe 52. Compressed air, as from a compressed air header or manifold 60, is supplied through air pipe 55 satisfactorily at a pressure of about 4 p.s.i. and is allowed to flow out of the foraminous terminal aerating section 57 of pipe 55 and to bubble upwards through vertical pipe 52 to the surface 53 of the water in flocculator 15.

The rising stream of bubbles constitutes an air-lift whereby the bubbles lower the density of the water through which they are upwardly rising. Such lowered density, although both local and transitory, induces flow from outside areas into the lighter column of water, thus inducing, hydrodynamically rather than mechanically, a backward or feed-back flow (from the right to the left of FIG. 2 and up vertical pipe 52) of concentrated flocculant material adjacent inlet 51 of pipe 50 and without subsequent breakdown or peptizing of the floc. Satisfactory results according to this invention are achieved when from 5% to 50% of the flocculant-containing water adjacent the effluent end of the last flocculator 17 is returned through pipe 50 and vertical pipe 52 to adjacent the surface of the influent end of flocculator 15, whereby the density of floc particles produced in all the flocculator basins is enhanced and the toughness and resistance to deflocculation or peptizing of the floc is also substantially enhanced. Accordingly, a dosage of coagulating chemicals for a given throughput of raw water can be substantially decreased.

In other words, a water treating system in which satisfactory flocculation is achieved with perhaps 35 p.p.m. aluminum sulphate will flocculate as well or better with only 20 to 25 p.p.m. aluminum sulphate when the aforementioned hydrodynamic recirculation of feed-back of floc is provided. As will be apparent, however, the greater the amount of flocculating water which is recirculated through pipe 50 and its extension 52, the less the period of time in any given one of the flocculation basins 15, 16 and 17 will be required of the influent raw water. In a system, for example, having three flocculators each of which is subdivided into three sections and with a detention time of approximately seven minutes in each section, satisfactory results have been achieved using this invention with a throughput or optimum rate of feed-back of 200 gallons per minute admixed with 1000 per minute discharge. The 1000 g.p.m. represents, as will be apparent, an input of about 3000 g.p.m. or approximately 4.5 MGD.

Figure 4:
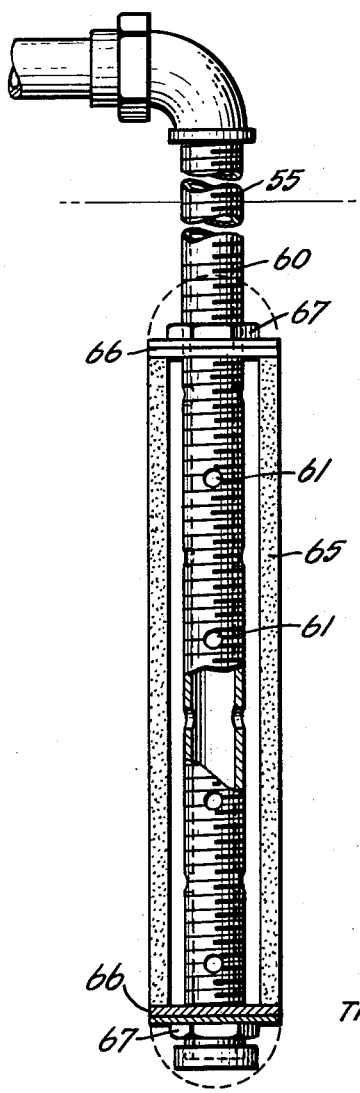
FIG. 4 is a view partially in section of one form of an aeration tube for practicing this invention.

FIG. 4 illustrates a preferred form of apparatus for the aerating terminal portion 57 of air pipe 55. As indicated, this includes air pipe 55 having threads 60 thereon and a plurality of perforations 61 therein. Satisfactory results have been achieved with air pipe 55 having approximately ¾" diameter and perforations 61 being approximately 5/16" diameter. Fitted over and around the terminal portion of air pipe 55 is a conventional porous carborundum diffuser 65 or equivalent air-pervious cylinder with end plates 66 and with the pervious cylinder 65 held in position on pipe 55 by threaded caps or lock nuts 67 threadably engaged with the thread 60 on pipe 55.

In this apparatus, air is forced under pressure through pipe 55 to emerge from perforations 61 therein into the interior of air-pervious cylinder 65. Since cylinder 65 is air-pervious, the air penetrates the ceramic or other porous construction of the cylinder 65 and accumulates on the exterior surface thereof to form air bubbles which peel off the surface of cylinder 65 and rise to the water level 53 in flocculator 15. Since the bubbles travel for a substantial proportion of this distance within vertical pipe 52, they induce, as previously explained, the hydrodynamic flow through line 50 and vertical extension 52 thereof to form the air-lift previously referred to.

Utilizing the teachings of this invention, it has been found that, in addition to lowering the requirements of additive coagulants, the floc actually produced in the final flocculation basin 17 and discharged into the sedimentation basin or basins 18, produces more enhanced coagulant efficiency and actually lowers coagulant requirements and materially enhances the coagulant removal of the impurities. By using the already formed floc as recirculated, it has been found that sedimentation or settling out of the precipitate in sedimentation basin(s) 18 occurs at a more rapid rate than would be the case if no circulation were effected or if recirculation of the floc were achieved by mechanical means which would tend to peptize or de-agglomerate the gelatinous precipitate.

From the standpoint of area requirements, the sedimentation basins may, in many instances, constitute a critical factor of plant design as a practical matter, sedimentation basins conventionally may be designed to operate at an overflow rate of about 600 gallons per square foot of surface area per day. According to this invention, however, satisfactory results are achieved at the rate of 800 gallons per square foot per day for equivalent efficiency of sedimentation and impurity removal, and, since it is usually desired that no more than 5% to 10% of floc is to be carried over from the sedimentation basins for removal at the filter beds, application of a device according to this invention also produces desirable lengthening of the filter runs and enhanced efficiency of filtration.

In connection with the foregoing, it should be noted that, although a floc feed-back of 5% to 50% of the concentrated floc from the last flocculator 17 may be satisfactorily recirculated to the entrance of the first flocculator 15, a preferred range is about 20% recirculation or feed-back, with highly satisfactory results having been achieved with the proportion of recirculated floc-containing water falling within the range of from within 10% to 30%. Also floc formed initially in the first flocculator 15 and having available, as nuclei or otherwise, recirculated floc from the last flocculator 17 has been found to have a much higher settling rate in the sedimentation basins 18 than floc formed under other circumstances and even with the introduction of bentonite and other materials to provide artificial turbidity for flocculation nuclei, thereby permitting the operation of existing sedimentation basins at a substantially higher overflow rate and with a substantially diminished detention period but with adequate impurity removal. The foregoing advantages are to be noted in addition to the obvious advantage of utilizing less chemical additive in the first place and requiring substantially less horsepower for total operation, satisfactory results having been achieved with the horsepower requirements for recirculation of concentrated floc at as much as 200 g.p.m. of not more than the about 1/20 H.P.

What is claimed is:

1. In a water treatment system for municipal and industrial water supplies in which a flocculating precipitant is added to the water to be treated in order to coagulate and form a flocculant precipitate therein for removing impurities therefrom by settling, the improvement for enhancing coagulation and flocculation of said precipitate priod to settling thereof which comprises in combination a flocculation basin for holding said water for the coagulation and formation of said flocculant precipitate therein, said flocculation basin having an inlet and an outlet for said water, agitating means in said flocculating basin for slowly agitating said water therein to increase coagulation and formation of said flocculant precipitate and to prevent settling of said precipitate in said flocculating basin, means for adding said flocculating precipitant to said water prior to introduction into said flocculating basin, a settling basin subsequent to said flocculating basin for holding said water with said flocculant precipitate therein substantially still for gravity settling of said precipitate in said settling basin, means for conducting said water with said flocculant precipitate suspended therein from said flocculating basin outlet to said settling basin, means in said flocculation basin and adjacent said outlet therefrom for collecting a small portion of water with said flocculant precipitate fully formed and flocculated therein, conduit means for leading said collected portion of water and precipitate back to adjacent said inlet to said flocculating basin for admixture of said portion of fully flocculated precipitate with water just entering said flocculating basin for enhancing the coagulation and formation of precipitate in said entering water, and means for inducing said return flow of said small portion of fully flocculated precipitate from adjacent said outlet of said flocculating basin through said conduit means and back to adjacent said inlet.

2. Apparatus as recited in claim 1 in which said means for inducing flow of said returned portion of flocculated precipitate includes a hollow diffusing member extending into said conduit means and means for supplying air under pressure into and through said diffusing member effecting airlift inducing flow of said flocculent precipitate in the absence of mechanical pumping agitation tending to break up and comminute said precipitate.

3. Apparatus as recited in claim 1 in which said collecting and conduit and flow inducing means for returning said fully flocculated precipitate back to adjacent the inlet of said flocculating basin includes a submerged conduit extending adjacent the bottom of said flocculating basin from said outlet thereof toward said inlet, an upwardly extending portion on said conduit leading toward said inlet of said flocculating basin and terminating below the level of water in said basin adjacent said inlet, and airlift means in said upwardly extending portion of said conduit for inducing flow of said portion of flocculation precipitate therethrough from adjacent said outlet of said flocculating basin for admixture with water and precipitant upon entering said flocculating basin.

References Cited in the file of this patent

UNITED STATES PATENTS

| | | |
|---|---|---|
| 2,349,390 | Tolman | May 23, 1944 |
| 2,373,154 | Welp | Apr. 10, 1945 |
| 2,568,452 | Kelly et al. | Sept. 18, 1951 |
| 2,679,477 | Kivari et al. | May 25, 1954 |